United States Patent
Krumpe, Jr.

(10) Patent No.: US 8,621,081 B2
(45) Date of Patent: Dec. 31, 2013

(54) HYPERVISOR CONTROLLED USER DEVICE THAT ENABLES AVAILABLE USER DEVICE RESOURCES TO BE USED FOR CLOUD COMPUTING

(75) Inventor: Michael D. Krumpe, Jr., Charlotte, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 196 days.

(21) Appl. No.: 13/329,739

(22) Filed: Dec. 19, 2011

(65) Prior Publication Data

US 2012/0173730 A1 Jul. 5, 2012

Related U.S. Application Data

(60) Provisional application No. 61/427,947, filed on Dec. 29, 2010.

(51) Int. Cl.
*G06F 15/173* (2006.01)

(52) U.S. Cl.
USPC .................. 709/226; 709/224; 709/223

(58) Field of Classification Search
USPC .............. 709/226, 224, 223, 218; 706/52; 718/104, 1; 726/8, 3; 711/162
See application file for complete search history.

(56) References Cited

U.S. PATENT DOCUMENTS

| | | | |
|---|---|---|---|
| 2010/0037296 A1* | 2/2010 | Silverstone | 726/3 |
| 2010/0262794 A1* | 10/2010 | De Beer et al. | 711/162 |
| 2011/0010706 A1* | 1/2011 | Lambert et al. | 718/1 |
| 2011/0072431 A1* | 3/2011 | Cable et al. | 718/1 |
| 2011/0126207 A1* | 5/2011 | Wipfel et al. | 718/104 |
| 2011/0126275 A1* | 5/2011 | Anderson et al. | 726/8 |
| 2011/0270953 A1* | 11/2011 | Levine et al. | 709/218 |
| 2012/0089980 A1* | 4/2012 | Sharp et al. | 718/1 |
| 2012/0110588 A1* | 5/2012 | Bieswanger et al. | 718/104 |
| 2012/0130936 A1* | 5/2012 | Brown et al. | 706/52 |

* cited by examiner

*Primary Examiner* — Le H Luu

(57) ABSTRACT

A user device starts a host operating system provided on the user device, when the user device is powered on, and launches a hypervisor with the host operating system. The user device also launches a first guest operating system, provided on the user device, with the hypervisor of the user device, and controls, via the hypervisor, resource usage by the first guest operating system. The user device further provides an interface to display the first guest operating system to a user of the user device, and provides, via the hypervisor, available resource information, associated with the user device, to a management server.

21 Claims, 7 Drawing Sheets

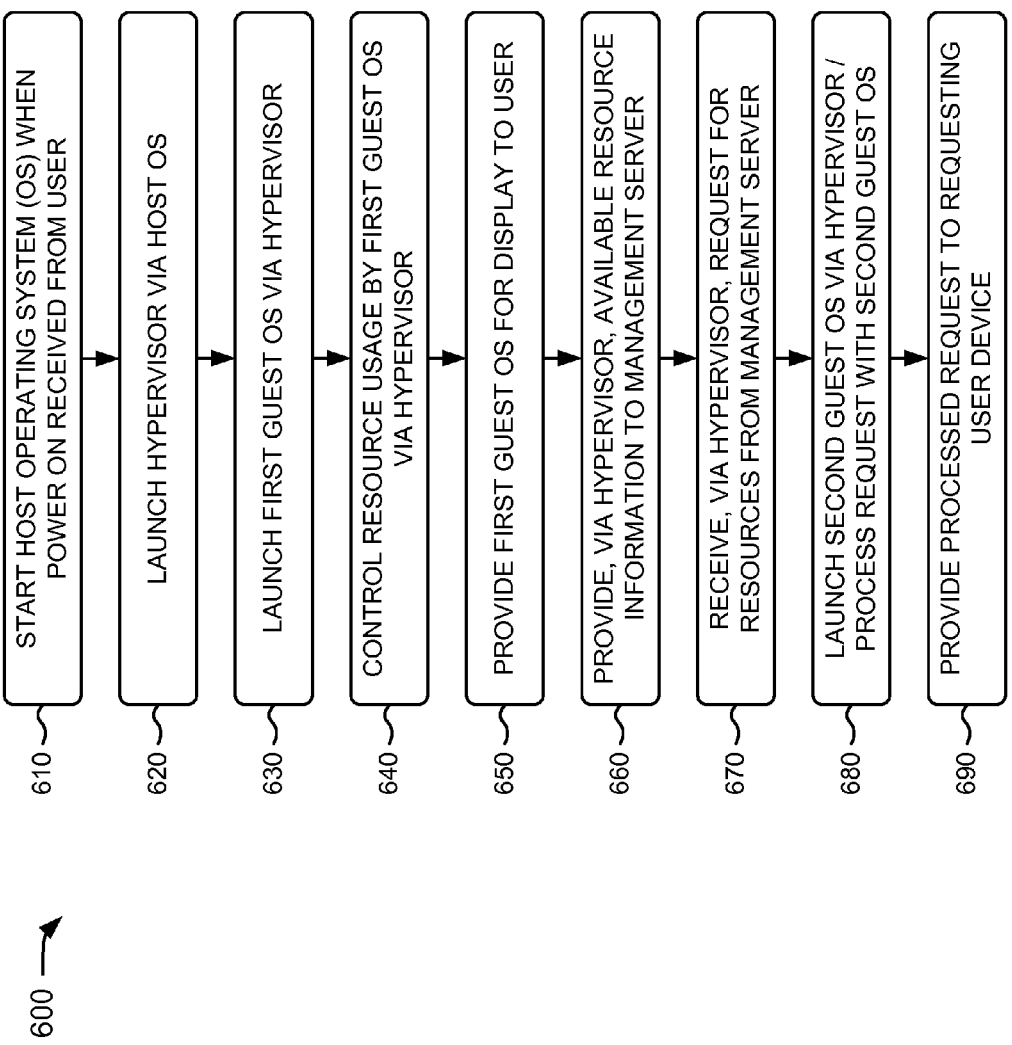

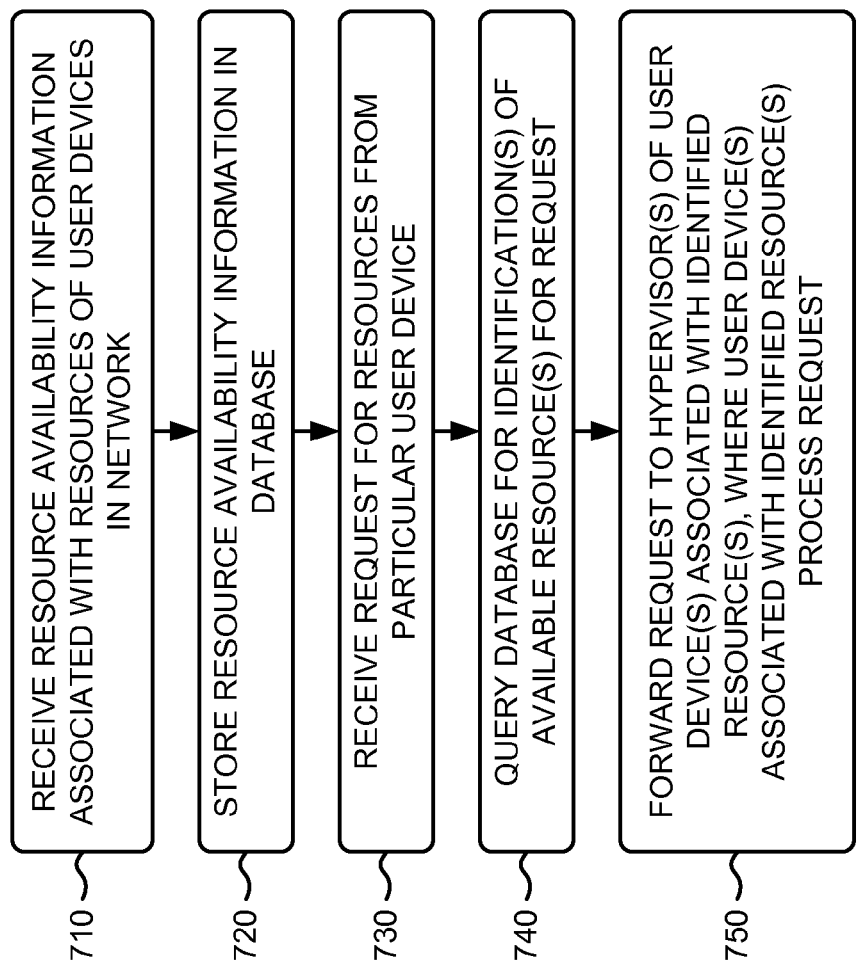

HYPERVISOR CONTROLLED USER DEVICE THAT ENABLES AVAILABLE USER DEVICE RESOURCES TO BE USED FOR CLOUD COMPUTING

RELATED APPLICATION

This application claims priority under 35 U.S.C. §119 based on U.S. Provisional Patent Application No. 61/427,947, filed Dec. 29, 2010, the disclosure of which is incorporated by reference herein in its entirety.

BACKGROUND

Cloud computing is the delivery of computing as a service rather than as a product, whereby shared resources, software, and information are provided to client devices (e.g., computers, smart phones, etc.) as a utility over a secure or an unsecure network, such as the Internet. Cloud computing environments provide computation, software, data access, and/or storage services that do not require end-user knowledge of a physical location and configuration of a system that delivers the services.

Cloud computing environments may be provided by devices (e.g., servers) provided in a data center. A data center is a facility used to house computer systems and associated components, such as telecommunications and storage systems. Organizations, such as corporations, may utilize cloud computing environments to provide extra resources (e.g., computing resources) for employees of the organizations. However, such organizations typically include networks of interconnected user devices (e.g., personal computers, desktop computers, laptop computers, smart phones, etc.) with underutilized resources.

BRIEF DESCRIPTION OF THE DRAWINGS

FIG. 6 is a flow chart of an example process for providing a hypervisor controlled user device that enables available user device resources to be used for cloud computing according to an implementation described herein; and FIG. 7 is a flow chart of an example process for determining and allocating available resources of interconnected user devices according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a hypervisor of a user device to launch a guest operating system residing on the user device (e.g. rather than on a remote resource), and to display the guest operating system to a user. The guest operating system may provide functionality, to the user, which may be provided by a typical operating system. However, the hypervisor may control resource usage of the guest operating system so that the user device may include available resources (e.g., processors, memories, etc.). Other user devices, interconnected with the user device, may be similarly arranged. Information associated with the available resources of the user devices may be provided to a cloud (or distributed computing) management device, such as a management server. The management server may manage and allocate the available resources for internal cloud computing, cluster computing, distributed computing, parallel computing, etc. For example, if the management server receives a request for available resources from a particular user device, the management server may identify available resources and may allocate one or more of the available resources to the particular device. The allocated resources may process the request, and may provide results of processing of the request to the particular user device.

The systems and/or methods may enable organizations to take advantage of existing resources (e.g., in the user devices) across the organizations' networks and to utilize the existing resources in a cloud computing environment with little additional investment. Unlike current cloud computing techniques or desktop virtualizations which put the cloud or virtual environments in server-based environments, the systems and/or methods described herein may provide the cloud in the user devices. For example, the systems and/or methods may configure a hypervisor to execute on a user device (e.g., rather than on server devices), and may enable a user to utilize the user device while the user device lends user device resources to a cloud computing environment.

As used herein, the term "user" is intended to be broadly interpreted to include a user device or a user of a user device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
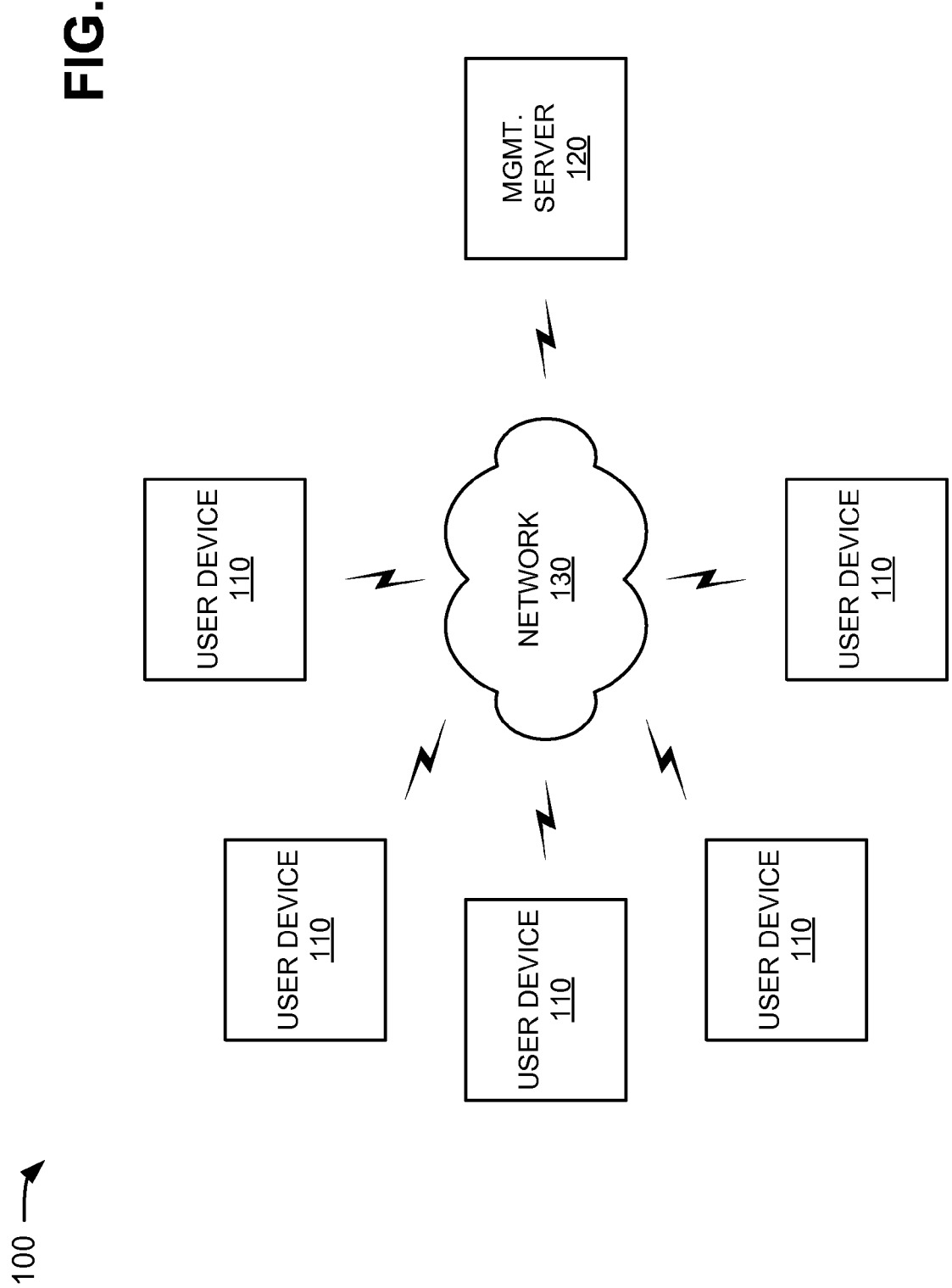
FIG. 1 is a diagram of an example network in which systems and/or methods described herein may be implemented.

FIG. 1 is a diagram of an example network 100 in which systems and/or methods described herein may be implemented. As illustrated, network 100 may include one or more user devices 110 and a management server 120 interconnected by a network 130. Devices and/or networks of network 100 may interconnect via wired and/or wireless connections. Five user devices 110, one management server 120, and one network 130 have been illustrated in FIG. 1 for simplicity. In practice, there may be more user devices 110, management servers 120, and/or networks 130.

User device 110 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a gaming system; a global positioning system (GPS) device; a set-top box (STB), a television, or other types of computation and communication devices. In one example, user devices 110 may include hypervisors (described below in FIG. 4) that are capable of communicating with hypervisors of other user devices 110 and/or with management server 120 via network 130.

Management server 120 may include one or more server devices, or other types of computation and communication devices, that gather, process, search, and/or provide information in a manner described herein. In one example implementation, management server 120 may include cloud management software (e.g., Eucalyptus, OpenNebula, etc.) that connects management server 120 with hypervisors provided in user devices 110, via network 130. Management server 120 may receive resource availability information associated with resources of user devices 110, and may store the resource availability information in a database associated with management server 120. Management server 120 may receive a request for resources from a particular user device 110, and may query the database for identifications of available resources for the request. Management server 120 may forward the request to hypervisors of user devices 110 associated with the identified resources, and the identified resources of the user devices 110 may process the request.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
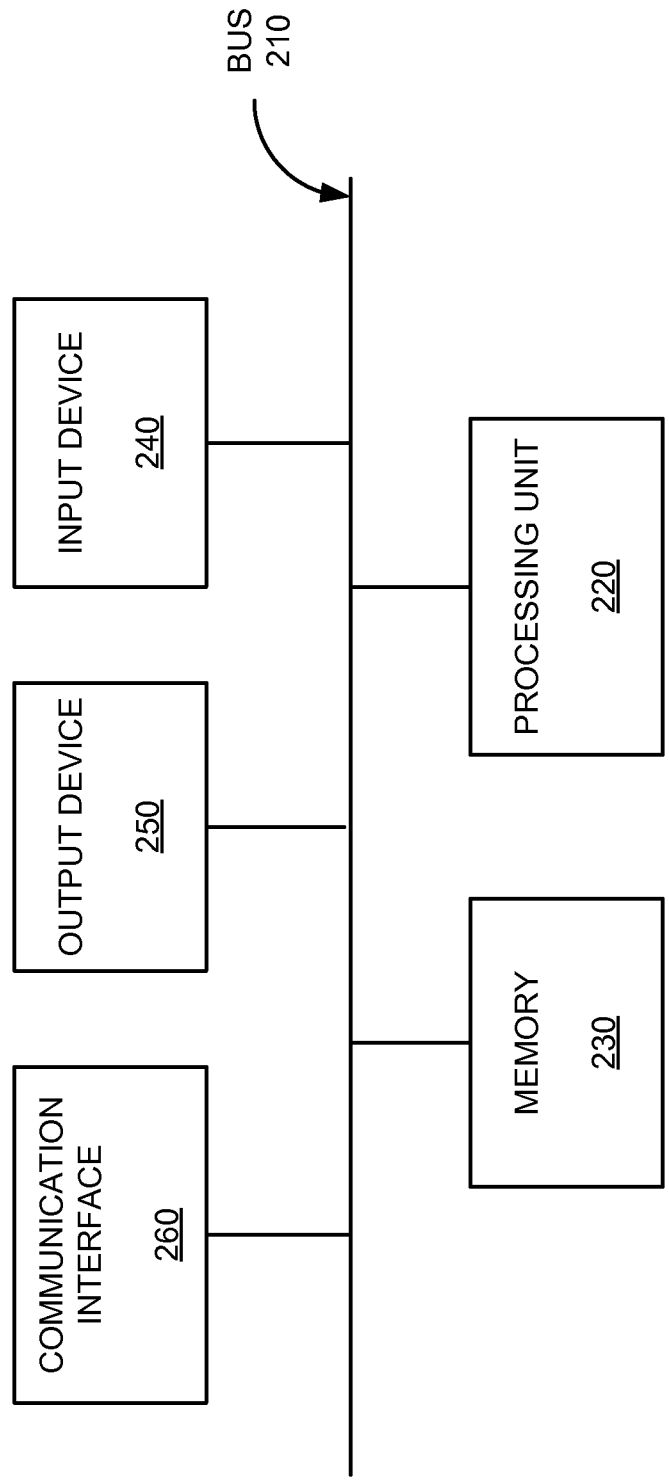
FIG. 2 is a diagram of example components of a device that may correspond to one of the devices of the network depicted in FIG. 1.

FIG. 2 is a diagram of example components of a device 200 that may correspond to one of the devices of network 100. In one example implementation, one or more of the devices of network 100 may include one or more devices 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
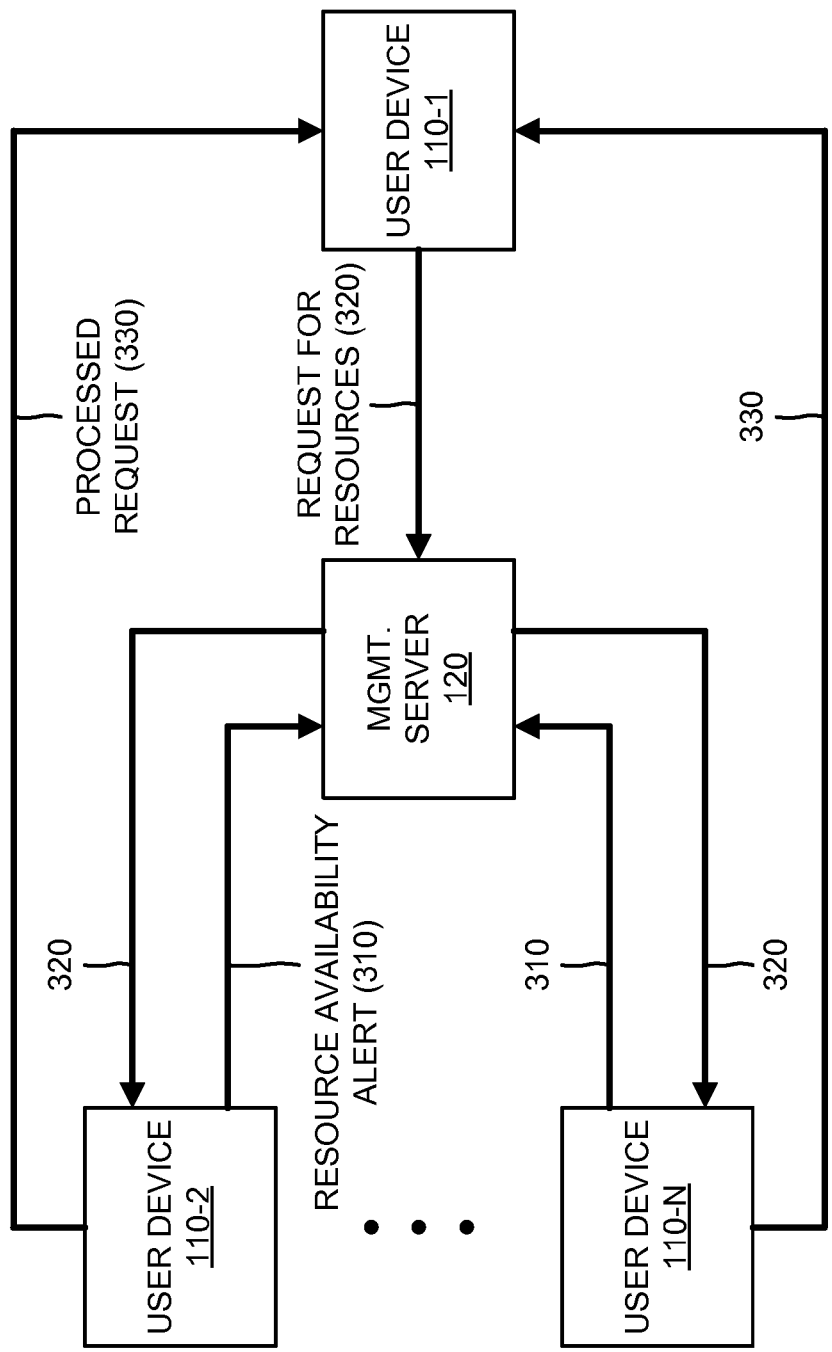
FIG. 3 is a diagram of example operations capable of being performed by an example portion of the network of FIG. 1.

FIG. 3 is a diagram of example operations capable of being performed by an example portion 300 of network 100 (FIG. 1). As shown, network portion 600 may include multiple user devices 110-1 through 110-N, and management server 120. User devices 110 and management server 120 may include the features described above in connection with, for example, one or more of FIGS. 1 and 2.

As further shown in FIG. 3, user devices 110-2 through 110-N may provide resource availability alerts 310 to management server 120, and management server 120 may receive resource availability alerts 310. Resource availability alerts 310 may include information associated with available resources (e.g., processors, memories, etc.) provided in user devices 110-2 through 110-N, such as information describing excess resources that are available on user devices 110. For example, resource availability alert 310 may include an indication that a processor or memory of user device 110 is only at 10% of capacity. Although not shown in FIG. 3, user device 110-1 may also provide a resource availability alert 310 to management server 120. However, for purposes of FIG. 3, user device 110-1 may not have any resources available, and may not generate resource availability alert 310. Management server 120 may store resource availability alerts 310 in a database associated with management server 120.

User device 110-1 may wish to perform an operation (e.g., execute an application, process images, etc.), but may not have the resources available to perform the operation. In such a situation, user device 110-1 may provide a request 320 for resources to management server 120, and management server 120 may receive request 320. Request 320 may include, for example, a request for resources to perform the operation that user device 110-1 is unable to perform. Management server 120 may query the database, associated with management server 120, for identifications of available resources (e.g., in user devices 110-2 through 110-N) for request 320.

Management server 120 may forward request 320 to hypervisors of user devices 110 associated with the identified available resources. For example, as shown in FIG. 3, management server 120 may forward request 320 to user device 110-2 and user device 110-N. User devices 110-2/110-N may receive request 320, and may process all or a portion of request 320. For example, user device 110-2 may perform a portion of the operation associated with request 320, and user device 110-N may perform a remaining portion of the operation associated with request 320. As further shown in FIG. 3, user devices 110-2/110-N may provide a processed request 330 to user device 110-1. Processed request 330 from user device 110-1 may include results of performance of the portion of the operation associated with request 320, and processed request 330 from user device 110-N may include results of performance of the remaining portion of the operation associated with request 320.

Although FIG. 3 shows example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300.

Figure 4:
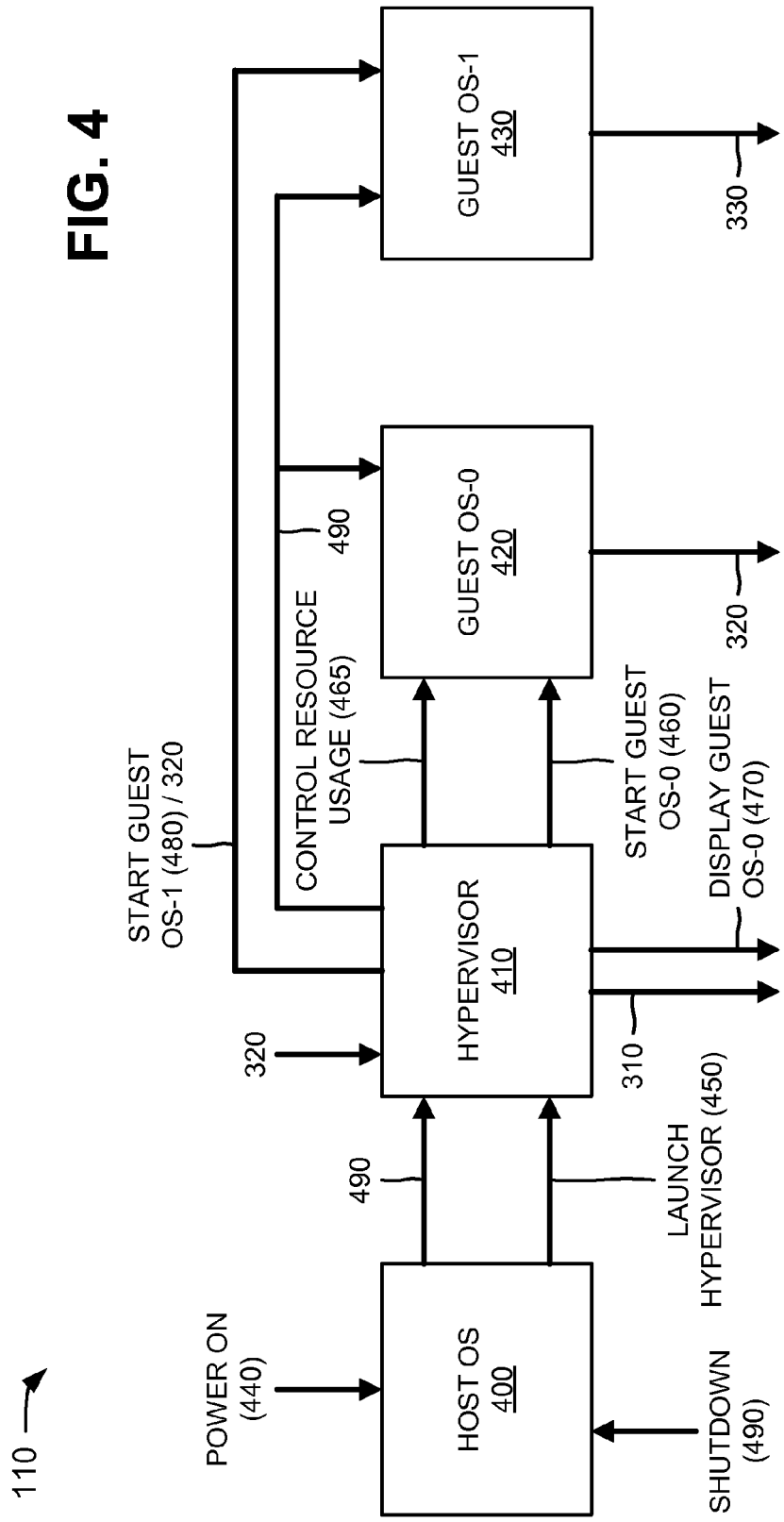
FIG. 4 is a diagram of example functional components of a user device depicted in FIG. 1.

FIG. 4 is a diagram of example functional components of user device 110. In one implementation, the functions described in connection with FIG. 4 may be performed by one or more components of device 200 (FIG. 2) or by one or more devices 200. As shown in FIG. 4, user device 110 may include a host operating system (OS) 400, a hypervisor 410, a first guest operating system (OS-0) 420, and a second guest operating system (OS-1) 430.

Host operating system 400 may include a primary boot operating system, such as, for example, a Linux operating system (e.g., Debian). Host operating system 400 may download and install drivers needed to configure user device 110. Once the drivers are setup, host operating system 400 may provide root privileges to a user of user device 110. Host operating system 400 may check and verify network parameters, routes, domain name system (DNS), etc., and may execute any updates to ensure a latest version of host operating system 400 is being utilized. Host operating system 400 may also install additional base setup software for user device 110.

Hypervisor 410 may provide hardware virtualization techniques that allow multiple operating systems (e.g., guest operating systems 420 and 430) to execute concurrently on user device 110. Hypervisor 410 may present a virtual operating platform to guest operating systems 420 and 420, and may manage the execution of guest operating systems 420 and 430. Multiple instances of a variety of operating systems may share the virtualized hardware resources. Hypervisor 410 may provide an interface to infrastructure as a service (IaaS) provided by user device 110. In one example, hypervisor 410 may be capable of providing a console to a screen of a selected guest operating system, and host operating system 400 may be omitted from user device 110.

In one example implementation, hypervisor 410 may include a VM VirtualBox hypervisor, available from Oracle Corporation, or other similar hypervisors (e.g., a Xen hypervisor, a Kernel Virtual Machine (KVM) Linux virtualization hypervisor, etc.). In one example, the VM VirtualBox hypervisor may be configured as follows: (1) a file (e.g., ".xserverrc") may be created in a root home or a user home; (2) a file (e.g., ".xsession") may be created; (3) settings in a particular directory (e.g., "/etc/X11/Xwrapper.config") may be changed to allow all users; (4) an X server and a second virtual machine may be auto started after a first virtual machine and host operating system 400 are fully configured; (5) the file (e.g., ".xsession") may be edited; and (6) a boot timeout in a directory (e.g., "/boot/grub/menu.1st") may be changed to a particular time (e.g., one second).

First guest operating system 420 may include a secondary operating system that is installed in user device 110 in addition to host operating system 400. First guest operating system 420 may include a Microsoft Windows Desktop operating system, a Microsoft Windows Server operating system, a Linux operating system, etc. In one example, unlike typical operating systems, first guest operating system 420 may utilize very little (e.g., less than ten percent) of the resources (e.g., processors, memories, etc.) of user device 110.

Second guest operating system 430 may include another secondary operating system that is installed in user device 110 in addition to host operating system 400 and first guest operating system 420. Second guest operating system 430 may include a Microsoft Windows Desktop operating system, a Microsoft Windows Server operating system, a Linux operating system, etc. In one example, second guest operating system 430 may enable user device 110 to process requests (e.g., request 320) from other user devices 110.

As further shown in FIG. 4, when a user powers on user device 110, as indicated by reference number 440, host operating system 400 may launch hypervisor 410, as indicated by reference number 450. Based on command 450 from host operating system 400, hypervisor 410 may launch, and may start first guest operating system 420, as indicated by reference number 460. Hypervisor 410 may also control resource usage of first guest operating system 420, as indicated by reference number 465, so that first guest operating system 420 does not utilize above a threshold amount (e.g., forty percent, fifty percent, etc.) of the resources (e.g., processors, memories, etc.) of user device 110. Hypervisor 410 may monitor resource usage by first guest operating system 420 to determine the availability of the resources of user device 110. When hypervisor 410 determines that user device 110 has available resources, hypervisor 410 may provide resource availability alert 310 to management server 120 (not shown in FIG. 4).

Although not shown in FIG. 4, host operating system 400 may execute an X window system or similar software. An X window system is a computer software system and network protocol that provides a basis for graphical user interfaces (GUIs) and rich input device capability for networked devices, such as user device 110. The X window system may load a "headless" display, and hypervisor 410 may load a full screen "headless" console window. The full screen "headless" console window may provide an interface to display first guest operating system 420, as indicated by reference number 470, and the user may interact with first guest operating system 420. To the user, first operating system 420 may appear and function in a similar manner as a standard operating system.

As further shown in FIG. 4, hypervisor 410 may receive request 320 from management server 120 (not shown in FIG. 4). As described above, request 320 may include, for example, a request for resources of user device 110 to perform an operation. Based on request 320, hypervisor 410 may utilize the available resources of user device 110 (e.g., indicated in resource availability alert 310) to start second guest operating system 430, as indicated by reference number 480. Hypervisor 410 may provide request 320 to second guest operating system 430 so that second guest operating system 430 may process request 320 (e.g., perform the operation of request 320). Second guest operating system 430 may receive request 320, and may process all or a portion of request 320 utilizing the available resources of user device 110. For example, second guest operating system 430 may perform the operation associated with request 320 to produce results (e.g., processed request 330) associated with performance of the operation. Second guest operating system 430 may provide processed request 430 to a user device 110 (not shown in FIG. 4) that generated request 320.

In one example, if user device 110 does not have enough resources to perform an operation (e.g., execute an application), user device 110 may request, from management server 120, additional resources to perform the operation. As shown in FIG. 4, in such a situation, first guest operating system 420 may provide request 320 to management server 120 (not shown in FIG. 4), and management server 120 may forward request 320 to user device(s) 110 with available resources.

As further shown in FIG. 4, when the user wants to shutdown user device 110, a shutdown command 490 may be provided to host operating system 400. Host operating system 400 may provide shutdown command 490 to hypervisor 410, and hypervisor 410 may shutdown first guest operating system 410 and second guest operating system 420 (if previously started) based on shutdown command 490. After shutting down first guest operating system 410 and second guest operating system 420, hypervisor 410 may shut down and then host operating system 400 may shut down.

Although FIG. 4 shows example functional components of user device 110, in other implementations, user device 110 may include fewer functional components, different functional components, differently arranged functional components, or additional functional components than depicted in FIG. 4. Alternatively, or additionally, one or more functional components of user device 110 may perform one or more other tasks described as being performed by one or more other functional components of user device 110. In one example, the functional components of user device 110 may be utilized with a terminal that may communicate with second guest operating system 430. This may permit two or more users to use the same user device 110, but different guest operating systems, at the same time.

Figure 5:
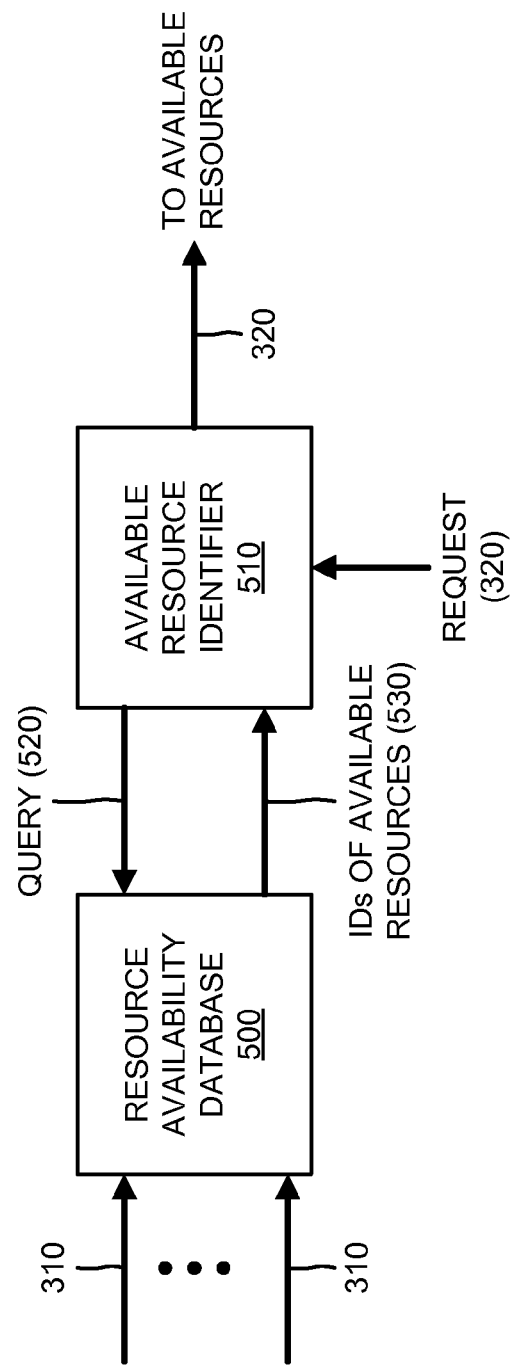
FIG. 5 is a diagram of example functional components of a management server depicted in FIG. 1.

FIG. 5 is a diagram of example functional components of management server 120. In one implementation, the functions described in connection with FIG. 5 may be performed by one or more components of device 200 (FIG. 2) or by one or more devices 200. As shown in FIG. 5, management server 120 may include a resource availability database 500 and an available resource identifier 510.

Resource availability database 500 may include one or more storage devices (e.g., memory 230, FIG. 2) that may store information received by and/or provided to management server 120. For example, as shown in FIG. 5, resource availability database 500 may receive and store one or more resource availability alerts 310 from user devices 110. Resource availability alerts 310 may include information associated with available resources (e.g., processors, memories, etc.) provided in user devices 110, such as capacities of processors of user devices 110, percent utilization of the processors, capacities of memories of user devices 110, percent utilization of the memories, etc. The term "database," as used herein, is to be broadly construed to include a database, file, a memory object, or another data structure that stores resource availability information, such as resource availability alerts 310.

Available resource identifier 510 may receive request 320 for resources from a particular user device 110. Request 320 may include, for example, a request for resources to perform an operation that the particular user device 110 is unable to perform. Based on request 320, available resource identifier 510 may provide a query 520 to resource availability database 500. Query 520 may include a request for identifications of available resources (e.g., in user devices 110 other than the particular user device 110) for request 320. Based on query 520, resource availability database 500 may return identifications 530 of user devices 110 with available resources. Available resource identifier 510 may forward request 320 to hypervisors of user devices 110 with available resources, as identified by identifications 530.

Although FIG. 5 shows example functional components of management server 120, in other implementations, management server 120 may include fewer functional components, different functional components, differently arranged functional components, or additional functional components than depicted in FIG. 5. Alternatively, or additionally, one or more functional components of management server 120 may perform one or more other tasks described as being performed by one or more other functional components of management server 120.

FIG. 6 is a flow chart of an example process 600 for providing a hypervisor controlled user device that enables available user device resources to be used for cloud computing according to an implementation described herein. In one implementation, process 600 may be performed by user device 110. Alternatively, or additionally, some or all of process 600 may be performed by another device or group of devices, including or excluding user device 110.

As shown in FIG. 6, process 600 may include starting a host operating system when a power on is received from a user (block 610), launching a hypervisor via the host operating system (block 620), and launching a first guest operating system via the hypervisor (block 630). For example, in an implementation described above in connection with FIG. 4, when a user powers on user device 110, as indicated by reference number 440, host operating system 400 may launch hypervisor 410, as indicated by reference number 450. Based on command 450 from host operating system 400, hypervisor 410 may launch, and may start first guest operating system 420, as indicated by reference number 460.

As further shown in FIG. 6, process 600 may include controlling resource usage by the first guest operating system via the hypervisor (block 640), providing the first guest operating system for display to the user (block 650), and providing, via the hypervisor, available resource information to a management server (block 660). For example, in an implementation described above in connection with FIG. 4, hypervisor 410 may also control resource usage of first guest operating system 420, as indicated by reference number 465, so that first guest operating system 420 does not utilize above a threshold amount of the resources (e.g., processors, memories, etc.) of user device 110. Hypervisor 410 may monitor resource usage by first guest operating system 420 to determine the availability of the resources of user device 110. When hypervisor 410 determines that user device 110 has available resources, hypervisor 410 may provide resource availability alert 310 to management server 120. Hypervisor 410 may load a full screen "headless" console window. The full screen "headless" console window may display first guest operating system 420, as indicated by reference number 470, and the user may interact with first guest operating system 420.

Returning to FIG. 6, process 600 may include receiving, via the hypervisor, a request for resources from the management server (block 670), launching a second guest operating via the hypervisor and processing the request with the second guest operating system (block 680), and providing the processed request to a requesting user device (block 690). For example, in an implementation described above in connection with FIG. 4, hypervisor 410 may receive request 320 from management server 120. Based on request 320, hypervisor 410 may utilize the available resources of user device 110 (e.g., indicated in resource availability alert 310) to start second guest operating system 430, as indicated by reference number 480. Hypervisor 410 may provide request 320 to second guest operating system 430 so that second guest operating system 430 may process request 320 (e.g., perform the operation of request 320). Second guest operating system 430 may receive request 320, and may process all or a portion of request 320 utilizing the available resources of user device 110. Second guest operating system 430 may provide processed request 430 to a user device 110 that generated request 320.

FIG. 7 is a flow chart of an example process 700 for determining and allocating available resources of interconnected user devices according to an implementation described herein. In one implementation, process 700 may be performed by management server 120. Alternatively, or additionally, some or all of process 700 may be performed by another device or group of devices, including or excluding management server 120.

As shown in FIG. 7, process 700 may include receiving resource availability information associated with resources of user devices in a network (block 710), and storing the resource availability information in a database (block 720). For example, in an implementation described above in connection with FIG. 5, resource availability database 500, of management server 120, may include one or more storage devices that may store information received by and/or provided to management server 120. In one example, resource availability database 500 may receive and store one or more resource availability alerts 310 from user devices 110. Resource availability alerts 310 may include information associated with available resources (e.g., processors, memories, etc.) provided in user devices 110, such as capacities of processors of user devices 110, percent utilization of the processors, capacities of memories of user devices 110, percent utilization of the memories, etc.

As further shown in FIG. 7, process 700 may include receiving a request for resources from a particular user device (block 730), and querying the database for identification(s) of available resource(s) for the request (block 740). For example, in an implementation described above in connection with FIG. 5, available resource identifier 510, of management server 120, may receive request 320 for resources from a particular user device 110. Request 320 may include, for example, a request for resources to perform an operation that the particular user device 110 is unable to perform. Based on request 320, available resource identifier 510 may provide query 520 to resource availability database 500. Query 520 may include a request for identifications of available resources (e.g., in user devices 110 other than the particular user device 110) for request 320. Based on query 520, resource availability database 500 may return identifications 530 of user devices 110 with available resources.

Returning to FIG. 7, process 700 may include forwarding the request to hypervisor(s) of user device(s) associated with the identified resource(s), where the user device(s) associated with the identified resource(s) process the request (block 750). For example, in an implementation described above in connection with FIG. 3, management server 120 may forward request 320 to hypervisors of user devices 110 associated with the identified available resources. In one example, management server 120 may forward request 320 to user device 110-2 and user device 110-N. User devices 110-2/110-N may receive request 320, and may process all or a portion of request 320. In one example, user device 110-2 may perform a portion of the operation associated with request 320, and user device 110-N may perform a remaining portion of the operation associated with request 320. User devices 110-2/110-N may provide processed request 330 to user device 110-1. Processed request 330 from user device 110-1 may include results of performance of the portion of the operation associated with request 320, and processed request 330 from user device 110-N may include results of performance of the remaining portion of the operation associated with request 320.

Systems and/or methods described herein may enable a hypervisor of a user device to launch a guest operating system residing on the user device (e.g. rather than on a remote resource), and to display the guest operating system to a user. The guest operating system may provide functionality, to the user, which may be provided by a typical operating system. However, the hypervisor may control resource usage of the guest operating system so that the user device may include available resources (e.g., processors, memories, etc.). Other user devices, interconnected with the user device, may be similarly arranged. Information associated with the available resources of the user devices may be provided to a cloud (or distributed computing) management device, such as a management server. The management server may manage and allocate the available resources for internal cloud computing, cluster computing, distributed computing, parallel computing, etc. For example, if the management server receives a request for available resources from a particular user device, the management server may identify available resources and may allocate one or more of the available resources to the particular device. The allocated resources may process the request, and may provide results of processing of the request to the particular user device.

The systems and/or methods may enable organizations to take advantage of existing resources (e.g., in the user devices) across the organizations' networks and to utilize the existing resources in a cloud computing environment with little additional investment. Unlike current cloud computing techniques or desktop virtualizations which put the cloud or virtual environments in server-based environments, the systems and/or methods described herein may provide the cloud in the user devices. For example, the systems and/or methods may configure a hypervisor to execute on a user device (e.g., rather than on server devices), and may enable a user to utilize the user device while the user device lends user device resources to a cloud computing environment.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    starting, by a user device, a host operating system when the user device is powered on;
    launching a hypervisor with the host operating system of the user device;
    launching a first guest operating system with the hypervisor of the user device;
    controlling, by the hypervisor of the user device, resource usage by the first guest operating system;
    providing, by the user device, an interface to display the first guest operating system to a user of the user device; and
    providing, by the hypervisor of the user device, available resource information, associated with the user device, to a management server.

2. The method of claim 1, further comprising:
    receiving, by the hypervisor and from the management server, a request for resources to be utilized by a requesting user device;
    launching, by the hypervisor, a second guest operating system based on the request;
    processing the request with the second guest operating system; and
    providing the processed request to the requesting user device.

3. The method of claim 1, where the user device is provided in a network that includes other interconnected user devices and the management server.

4. The method of claim 1, where the available resource information includes one or more of:
    information associated with a capacity of a processor of the user device,
    information associated with a percent utilization of the processor,
    information associated with a capacity of a memory of the user device, or
    information associated with a percent utilization of the memory.

5. The method of claim 1, where the host operating system includes a Linux operating system.

6. The method of claim 1, further comprising:
    controlling the resource usage by the first guest operating system to prevent the first guest operating system from utilizing above a threshold amount of resources of the user device.

7. A user device, comprising:
    a memory to store a host operating system, a hypervisor, and a first guest operating system,
    a processor to:
        start the hypervisor when the user device is powered on,
        launch the first guest operating system with the hypervisor,
        control, via the hypervisor, resource usage by the first guest operating system,
        provide an interface to display the first guest operating system to a user of the user device, and
        provide, via the hypervisor, available resource information, associated with the user device, to a management server.

8. The user device of claim 7, where the processor is further to:
    receive, via the hypervisor and from the management server, a request for resources to be utilized by another user device,
    launch, via the hypervisor, a second guest operating system based on the request,
    process the request with the second guest operating system, and
    provide the processed request to the requesting user device.

9. The user device of claim 7, where the user device is provided in a network that includes other interconnected user devices and the management server.

10. The user device of claim 7, where the available resource information includes one or more of:
    information associated with a capacity of a processor of the user device,
    information associated with a percent utilization of the processor,
    information associated with a capacity of the memory, or
    information associated with a percent utilization of the memory.

11. The user device of claim 7, where the first guest operating system includes a Windows desktop operating system.

12. The user device of claim 7, where controlling the resource usage by the first guest operating system prevents the first guest operating system from utilizing above a threshold amount of resources of the user device.

13. The user device of claim 7, where the user device includes one of:
    a radiotelephone, a personal communications system (PCS) terminal,
    a smart phone,
    a personal digital assistant (PDA),
    a laptop computer,
    a tablet computer,
    a desktop computer, or
    a workstation computer.

14. The user device of claim 7, where the hypervisor includes one of:
    a VM VirtualBox hypervisor,
    a Xen hypervisor, or
    a Kernel Virtual Machine (KVM) Linux virtualization hypervisor.

15. A method, comprising:
    receiving, by a server device and from user devices, resource availability information associated with resources of the user devices,
        where the user devices are interconnected via a network and each user device includes a hypervisor to control resource usage by each user device;
    storing, by the server device, the resource availability information in a database associated with the server device;
    receiving, by the server device and from a particular user device, a request for resources;
    querying, by the server device, the database for an identification of an available resource provided in one of the user devices; and
    forwarding, by the server device, the request to a hypervisor of a user device associated with the identified available resource.

16. The method of claim 15, where the user device associated with the identified available resource processes the request and provides the processed request to the particular user device.

17. The method of claim 15, where the resource availability information includes one or more of:
- information associated with capacities of processors of the user devices,
- information associated with percent utilizations of the processors,
- information associated with capacity of memories of the user devices, or
- information associated with percent utilizations of the memories.

18. A server device, comprising:
a memory to store a database; and
a processor to:
- receive, from user devices, resource availability information associated with resources of the user devices, where the user devices are interconnected via a network and each user device includes a hypervisor to control resource usage by each user device,
- store the resource availability information in the database,
- receive, from a particular user device, a request for resources,
- provide a query to the database for an identification of an available resource provided in one of the user devices, and
- forward the request to a hypervisor of a user device associated with the identified available resource.

19. The server device of claim 18, where the server device includes a cloud management server device that provides a cloud computing environment via the user devices.

20. The server device of claim 18, where the user device associated with the identified available resource processes the request and provides the processed request to the particular user device.

21. The server device of claim 18, where the resource availability information includes one or more of:
- information associated with capacities of processors of the user devices,
- information associated with percent utilizations of the processors,
- information associated with capacity of memories of the user devices, or
- information associated with percent utilizations of the memories.

* * * * *